US006598732B2

(12) United States Patent

Guindulain Vidondo

(10) Patent No.: US 6,598,732 B2
(45) Date of Patent: Jul. 29, 2003

(54) DISTRIBUTOR

(75) Inventor: Félix Guindulain Vidondo, Peralta (ES)

(73) Assignee: Jofemar, S.A., Peralta (ES)

( * ) Notice: Subject to any disclaimer, the term of this patent is extended or adjusted under 35 U.S.C. 154(b) by 0 days.

(21) Appl. No.: 09/913,843

(22) PCT Filed: Dec. 29, 2000

(86) PCT No.: PCT/ES00/00497

§ 371 (c)(1), (2), (4) Date: Aug. 17, 2001

(87) PCT Pub. No.: WO01/65504

PCT Pub. Date: Sep. 7, 2001

(65) Prior Publication Data

US 2002/0125266 A1 Sep. 12, 2002

(30) Foreign Application Priority Data

Mar. 2, 2000 (ES) .......................................... 200000511

(51) Int. Cl.[7] ................................................ B65G 19/00

(52) U.S. Cl. .................................... 198/728; 221/150 R

(58) Field of Search ................................ 198/728, 729; 221/150 R, 253, 218

(56) References Cited

U.S. PATENT DOCUMENTS

| | | | | | |
|---|---|---|---|---|---|
| 1,375,060 | A | * | 4/1921 | Newdick | 198/729 |
| 2,272,750 | A | * | 2/1942 | Miller | 221/150 R |
| 2,765,101 | A | * | 10/1956 | Shanhouse et al. | 221/150 R |
| 3,185,280 | A | * | 5/1965 | Nathan et al. | 221/253 |
| 5,029,520 | A | * | 7/1991 | Okada | 221/150 R |
| 5,048,719 | A | * | 9/1991 | Empl et al. | 221/153 |
| 5,937,999 | A | * | 8/1999 | Spatafora | 198/728 |

* cited by examiner

*Primary Examiner*—Kenneth W. Noland
(74) *Attorney, Agent, or Firm*—Klauber & Jackson

(57) ABSTRACT

Improvements in patent of invention P9800864 for: vending machine, being of the type of vending machines that include refrigerating equipment keeping refrigerated products adequately preserved until they are consumed, the products to be dispensed being in some compartments, in order to be moved one by one by respective bodies (2) rotatably connected to a chain (3) geared between a pair of pinions (4). The base where the products are deposited is open in the center and in relation to whose opening there is the chain (3), in such a way that the bodies (2) have a center recess underneath whose sides there are respective lugs (9) and having in relation to the outside surface of the lugs (9) respective pivots (11), in orthogonal position towards the outside, which are positioned under the respective strips (6) that comprise the base where the products are deposited.

4 Claims, 4 Drawing Sheets

DISTRIBUTOR

OBJECT OF THE INVENTION

As expressed in the title of the present specification, the following invention refers to some improvements in Patent of Invention P9800864 for: vending machine, the improvements being based on the product dispensing mechanism, which is defined by a conveyor chain or conveyor belt provided with respective product conveying elements. Said elements are positioned equidistantly in accordance with the size of the products, in such a way that in the forward movement of the conveyor chain or conveyor belt the conveying elements push the products along a base open in the center and for the purpose of guaranteeing a perfect forward movement of the conveyor chain or conveyor belt the conveying elements have a pair of stubs that are under the two strips that define the base for positioning and forward movement of the goods.

In this way, the conveying elements are always in a vertical position on the base for positioning and forward movement of the goods and a possible rising of the goods with respect to the base is prevented, permitting the conveyor chain or conveyor belt to be released from the pinion, making it turn and not convey the chain in the interlocking.

FIELD OF APPLICATION

The dispensing mechanism that the improvements refer to is useful to be installed in product vending machines, especially in cold product vending machines that dispense products that should be kept at a low temperature and beverages that are dispensed cold.

BACKGROUND OF THE INVENTION

As indicated in Patent P9800864, vending machines that include refrigerating equipment are used to dispense cold drinks or food products which due to their ingredients need to be kept at a low temperature until they are consumed, in such a way that the mechanisms necessary for the removal of the selected products vary in one case or the other, as a logical result of the goods to be handled.

Hence, we can consider those vending machines of refrigerated food products that have some bodies rotating between two shafts, a top one and another bottom one, which are provided with some blades, which like compartments, house the goods to be dispensed.

The main inconvenience that this type of vending machine has is that the number of goods to be selected is very small, for example six. Furthermore, the distance between the blades that define the compartments is fixed, for which reason depending on the product to be placed in the compartment, it may happen that due to its volume there is a lot of wasted space.

The fact that the distance between the blades of the bodies where the products are deposited is fixed, is due to the fact that the owner of the vending machine is the one who should decide what goods are to be placed inside in order to be sold. Hence, the manufacturer should manufacture it with some fixed dimensions.

On the other hand, given that the bodies where the food products to be dispensed rotate between two vertically placed shafts, the position of the products in the front and rear part thereof is reversed and the products overturn. In the dispensing of the products, they drop towards the receiving box and this may deteriorate them.

Patent P9800864 describes a dispensing mechanism of the products deposited in the different compartments of some storage trays, which are defined by a base open in the center where the products are deposited. Under the center part of the base there is a chain or belt geared between some pinions, the corresponding motor transmitting rotating movement to one of the shafts of a pinion.

The conveying of the products in the removal thereof is carried out by some bodies that move them one by one and that slide with respect to the support base, in such a way that said bodies are connected to the conveyor chain or conveyor belt by means of some generally H-shaped intermediate bodies.

Hence, said generally H-shaped bodies at one of their ends connect rotatably to the conveyor belt and at their other end they connect to the conveying bodies, in such a way that upon moving on the open base they are in a vertical position and at the bottom part thereof they are released from the conveying base and they turn with respect to the chain occupying a minimum space.

For this reason the generally H-shaped intermediate body has in its part connecting to the chain respective pivots with respect to the inside surface of its wings that fit in respective holes of the chain, whereas in the part connecting to the conveying body it has respective pivots with respect to the outside surface of its wings that fit in respective holes of the inside surface of a center recess made in the generally rectangular-shaped products conveying the products.

Likewise, the bodies conveying the products have some flanges that abut to the base where the products are deposited in order to keep them in a vertical position and with respect to the center recess thereof the bodies have in the bottom in relation to both sides of the recess, respective flanges in a longitudinal direction.

Certificate of addition P9802496 of the main patent P9800864 describes some improvements in the dispensing mechanism in such a way that the bodies for conveying the products on the open base in the operations of removal of the products one by one, are connected rotatably to the conveyor chain itself, which for this purpose has some small projections very close to each other provided with some holes in which respective pivots of the inside surface of the center recess of the bodies for conveying the products fit.

These embodiments adequately meet their purpose, but if it is a question of trying to increase the range of goods to be dispensed and the goods are heavier, it may happen that in the conveying of the products on the base where they are deposited, due to the forward movement of the conveyor belt, the braking force manages to tighten the chain up to the point that it is released from the pinion, chain which rotates without there being any forward movement of the chain. This may hypothetically happen given that as the products act like brakes on the chain by means of the conveying bodies, the chain tends to rise in the center and its rising is caused at the sides up to the point that same is released. This is when the conveying pinion will rotate but it will not convey the chain.

DESCRIPTION OF THE INVENTION

The present specification describes some improvements in the dispensing mechanism of products of a vending machine for the purpose of guaranteeing a vertical position of the bodies conveying the products in the removal of the products, at the same time that a possible release of the conveyor chain with respect to the spur pinions is prevented, in such a way that it is of the type of vending machines that include refrigerating equipment that keeps the products refrigerated in order to adequately preserve them until they are consumed. These vending machines have the products to be dispensed in some compartments, so that the products are moved one by one by respective bodies connected rotatably to a chain geared between a pair of pinions and the base where the products are deposited being open in the center. The connecting chain of the bodies that move the products are in relation to said opening, in such a way that the cited bodies for movement of the products have a center recess in the bottom at whose sides there are respective lugs, in such a way that in relation to the outside surface of said lugs there are respective pivots, in orthogonal position towards the outside, which are positioned under the respective strips that form the base where the products are deposited, limiting the vertical movement of the chain to which the bodies for removal of the products are rotatably connected.

In a preferred embodiment of the invention, the pivots of the lugs, positioned orthogonally with respect to the outside surface thereof, are placed towards the rear part thereof with respect to the rotating connection of the bodies to the chain.

In this way, in the thrust and movement of the products a hypothetical release of the chain with respect to a spur pinion is prevented, that is to say, that the chain may be released from the drive pinion not causing the conveying of the chain and with this the products do not move forward on the open base where they are deposited.

DESCRIPTION OF A PREFERRED EMBODIMENT

Figure 1:
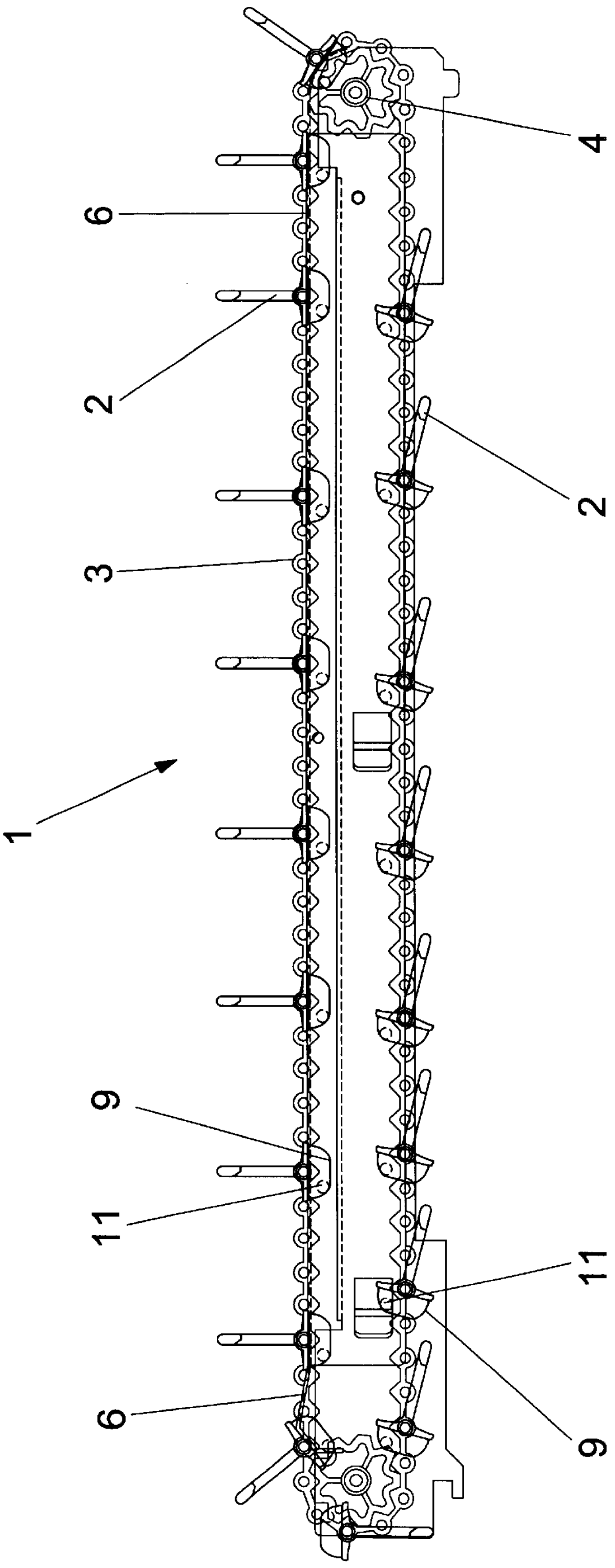
FIG. 1 shows a side raised view of the dispensing mechanism, different product conveying elements having been represented. It can be seen how in a vertical position of conveying the products on the base where the products are positioned, there is a pair of stubs under the cited base.
Figure 3:
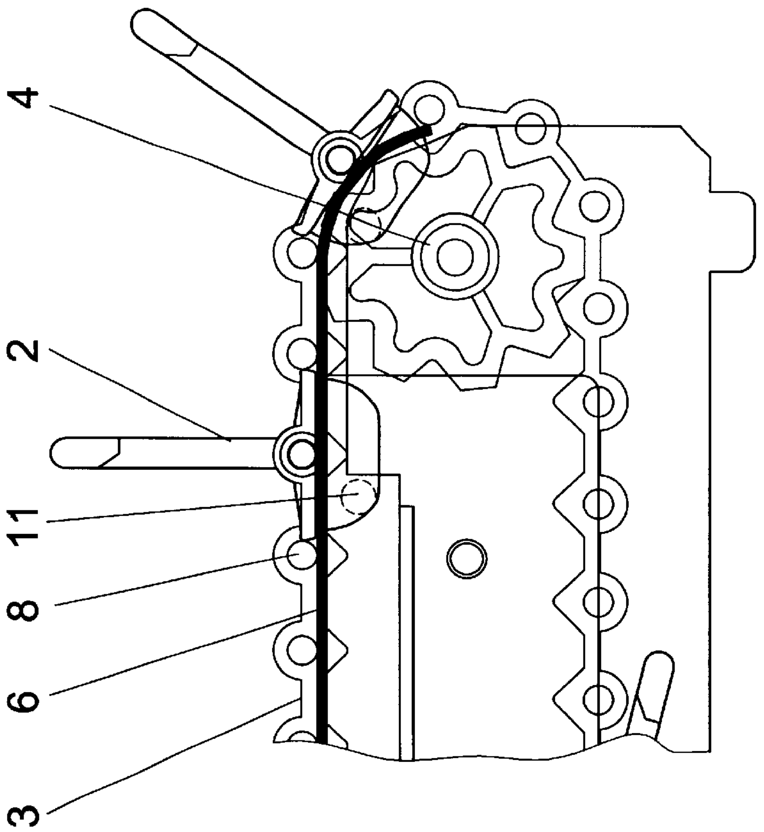
FIG. 3 shows a detailed side raised view of the end of the chain or belt by which the conveying elements of the products are released from the base where the products are positioned, the end being free from the conveying base and being able to rotate with respect to the pivots for fastening to the conveyor chain or conveyor belt.
Figure 2:
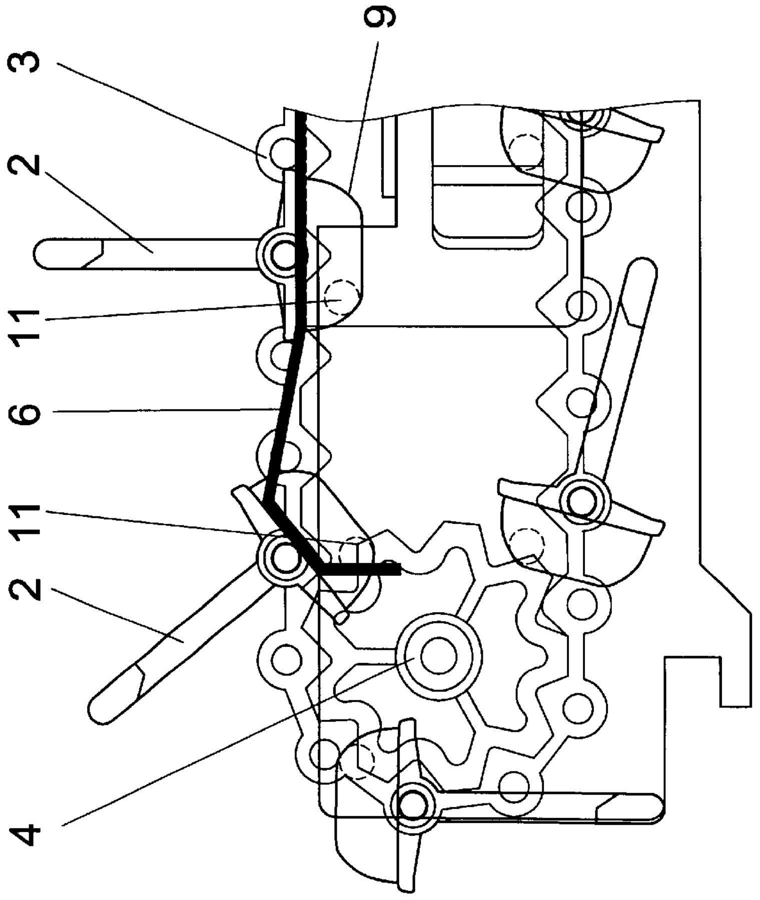
FIG. 2 shows a detailed side raised view of the end of the conveyor chain or conveyor belt by which the conveying elements are vertically positioned with respect to the base where the products are positioned.
Figure 4:
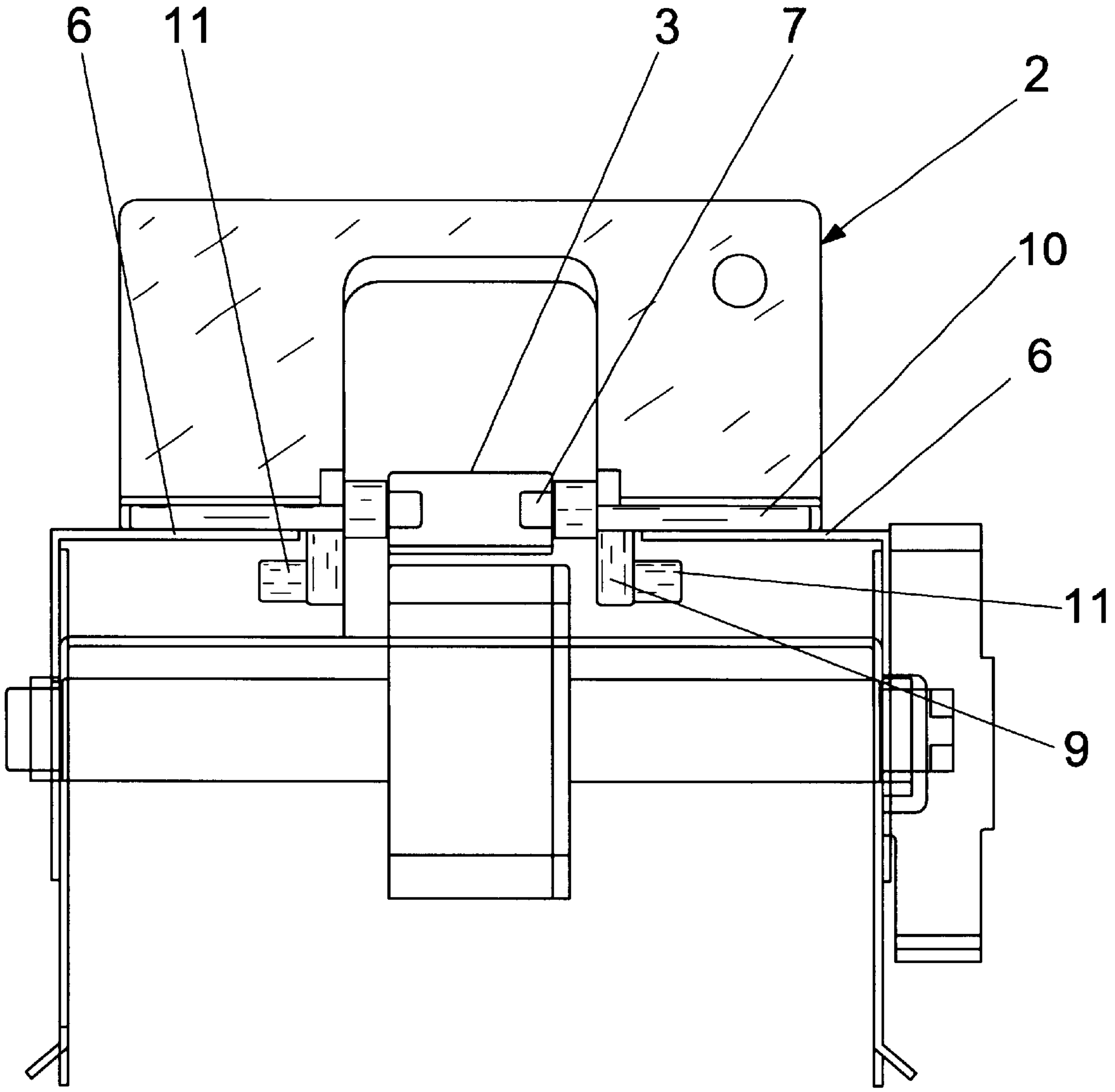
FIG. 4 shows a detailed front view of a conveying element in vertical position with respect to the base where the products are positioned and conveyed, showing how under the two strips that define the center open base there are respective stubs that limit the movement thereof.
Figure 5:
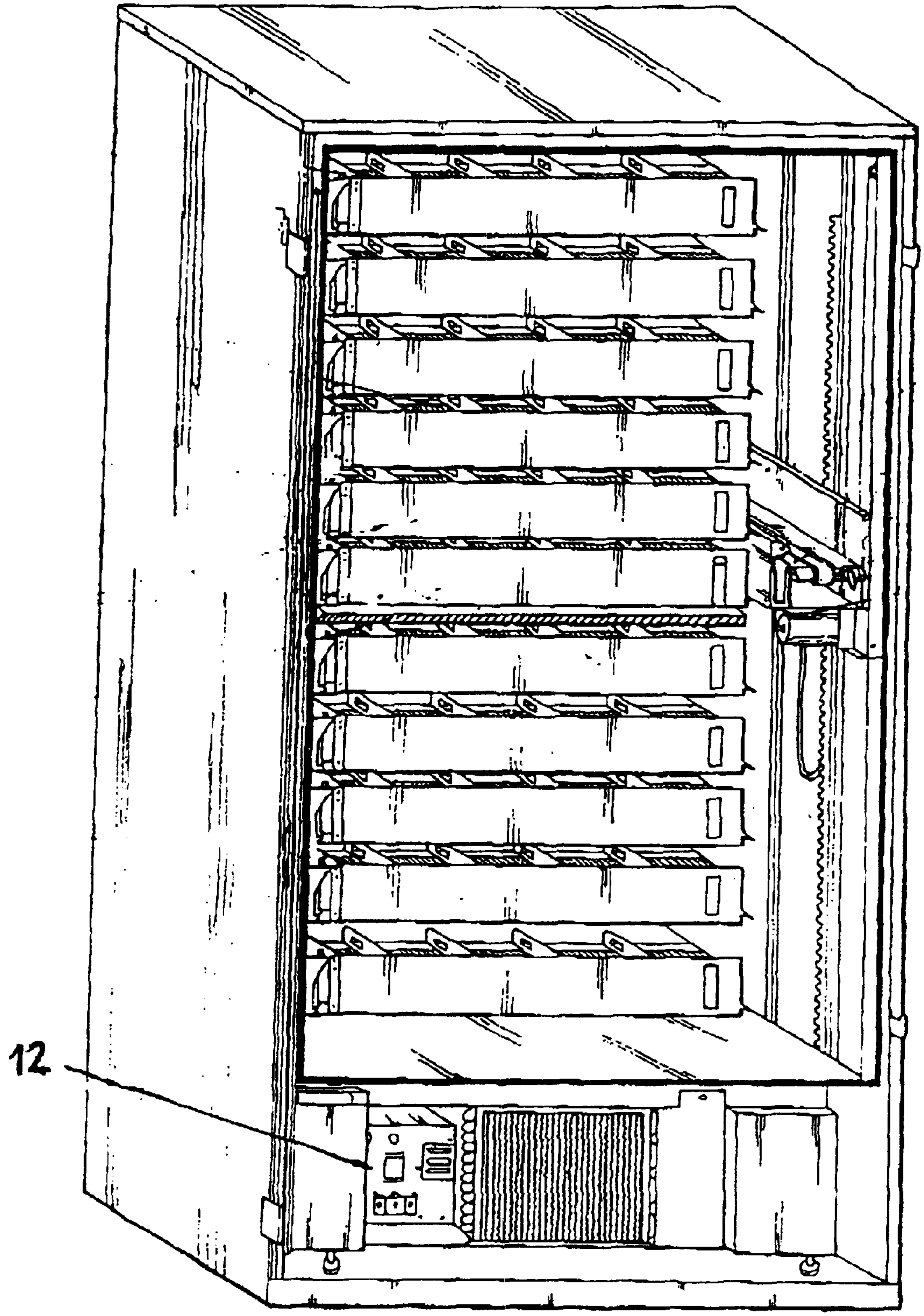
FIG. 5 shows a perspective view of the vending machine showing the refrigerating equipment.

In view of the commented figures and according to the numbering used, we can see how the dispensing mechanism (1), in accordance with what has been described and claimed in patent P9800864 and in its certificate of addition P9802496, is comprised of some bodies (2) for conveying the products, whose bodies (2) for conveying the products are rotatably connected to a chain (3) geared between a pair of pinions (4), to one of which the corresponding motor transmits rotating movement. The base where the products are deposited and moved forward is comprised of a center opening (5) that defines two side strips (6).

Besides, the bodies (2) conveying the products, when the corresponding product is expelled, by one of the ends of the chain, no longer have contact with the base where the products are deposited and conveyed, rotating freely with respect to the pair of pivots (7) of rotating connection to the chain (3), to which they connect upon fitting in the respective holes (8) of the chain.

The bodies (2) for conveying the products have the pair of pivots (7) with respect to the inside surface of the center recess and from whose sides respective lugs (9) originate in the bottom, and likewise the bodies (2) for conveying the products have some flanges (10) that are abutted against the strips (6) where the products are deposited and slide.

The lugs (9) are abutted to the inside side of the strips (6) where the products are deposited and move.

For the purpose of being able to increase the range of products to be dispensed and so that the conveyor belt (3) moves forward uniformly by the rotation of the pinion transmitting movement, without the chain being released, the bodies (2) where the products are conveyed have a pair of pivots (11) in relation to the outside surface of the lugs (9), which are under the strips (6) where the products are deposited and slide as they are pushed by the bodies (2). Said pivots (11) may be slightly placed towards the rear part, depending on the direction of forward movement of the chain.

In this way, in view of a greater force in the conveying of the products, the pivots (11) prevent the conveyor chain (3) from being able to rise and end up being released and hence there is an optimum operation and a larger variety of products can be conveyed.

In short, by including the pair of pivots (11), with respect to the inside surface of the bottom lugs (9) of the bodies (2), it is achieved that said bodies (2) are always in a vertical position when they are in relation to the strips (6) pushing the products to be dispensed.

The dispensing mechanism (1) is applicable to the type of vending machines that include refrigerating equipment (12) that keeps the products refrigerated in order to adequately preserve them until they are consumed.

What is claimed is:

1. A vending machine, having products to be dispensed stored on a base in a plurality of compartments, said base being made of strips and having an opening in a center wherein a chain is geared between a pair of pinions, said products being moved one by one by respective bodies rotatably connected to said chain, said bodies having a center recess underneath whose sides respective lugs are provided wherein said bodies comprise pivots provided in relation to an outer side of said lugs, said pivots orthogonally projecting outwards being positioned under said respective strips so as to limit vertical movement of said chain.

2. A vending machine according to claim 1, wherein the pivots are placed on a back portion of the lugs with respect to a rotating connection of the bodies to the chain.

3. A vending machine according to claim 1, comprising refrigerating equipment for keeping the products refrigerated so as to preserve said products until they are consumed.

4. A vending machine according to claim 2, comprising refrigerating equipment for keeping the products refrigerated so as to preserve said products until they are consumed.

* * * * *